United States Patent Office 2,800,389
Patented July 23, 1957

2,800,389

PRODUCTION OF METAL FLUORIDES

Isadore Mockrin, Philadelphia, Pa., assignor to Pennsalt Chemicals Corporation, a corporation of Pennsylvania No Drawing. Application November 17, 1953, Serial No. 392,747

2 Claims. (Cl. 23—88)

This invention relates to the manufacture of metal fluorides, and more particularly to the preparation of metal fluorides by initiating a reaction between substantially dry reactants at temperatures below 100° C.

It has generally been the practice in preparing metal fluorides to prepare the metal fluoride either by reacting the metal, or a metal compound, directly with gaseous fluorine or HF, or by reaction between metal compounds and HF in an aqueous solution.

The use of gaseous fluorine or hydrogen fluoride is objectionable due to their corrosive action. Where the reaction is carried out in an aqueous medium, considerable difficulty is frequently encountered in obtaining an anhydrous product. The combined water in the product is difficult to remove without loss of fluorine values. Another objection to aqueous reactions is that the water necessary for the reaction necessitates larger reaction equipment. Also, where aqueous solutions of hydrogen fluoride are used, acid corrosion of equipment becomes a definite problem.

I have now discovered a new process whereby metal fluorides can be prepared at relatively low temperatures. The process obviates the necessity of using an aqueous reaction medium or fluorinating agent like fluorine or hydrogen fluoride. I have discovered that when an alkali metal fluoride is ground together with a chloride or sulfate of a metal of the group consisting of berryllium, calcium, magnesium, strontium, barium, zinc, cadmium, copper, lead, aluminum, lithium and sodium, a reaction will proceed at temperatures below 100° C. Any of the alkali metal fluorides, with the exception of sodium and lithium, may be employed. In some instances the reaction occurs at room temperatures. This is surprising when it is considered that the reactants are substantially dry. The only moisture present is water of crystallization and what may be picked up from the air.

Since the reactions are substantially dry and occur at low temperatures, there is little if any problem with respect to equipment corrosion. Also, a substantial saving in reaction space is obtained over that necessary in aqueous phase reactions.

The reactions are all exothermic, and many of the reactions generate substantial amounts of heat. For example, when potassium fluoride and aluminum sulfate are ground together and brought to a temperature of about 30° to 40° C., the reaction proceeds with the generation of sufficient heat to raise the temperature of the reactants to above 100° C.

The reaction between potassium fluoride and aluminum sulfate is quite interesting. When the reactants are ground together at a temperature of approximately 30° C. (room temperature at the time of conducting the experiment) no reaction occurred during the grinding. However, when the mixture of the ground reactants are brought together in a mass and the mass then gently packed, a reaction was immediately initiated and the temperature of the reactants increased to approximately 100° C.

The reactions between the alkali metal fluorides and the other metal sulfates and chlorides, though mostly not as spectacular as that between the potassium fluoride and aluminum sulfate, all have the same basic characteristics in that the reactions are exothermic and proceed at temperatures below 100° C. in a substantially dry state if the reactants are first ground together in a powdered form. In many instances the initiating reaction temperature is room temperature, the reaction occurring in some instances during the grinding step.

In practicing the present invention, the alkali metal fluoride and the metal sulfate or chloride are mixed together as dry powders. This is preferably done by grinding. Where necessary, the mixture is then heated to the desired temperature of reaction. Since the reactions are substantially dry and occur at low temperatures, there is little, if any, difficulty with respect to equipment corrosion. Also, a substantial saving in reaction space is obtained over that necessary in aqueous phase reactions.

Another advantage of the present process is that the metal fluoride product can generally be readily separated from the reaction products by washing with water. This may be done by slurrying the reaction products in water. The metal fluoride, which is usually insoluble, remains in its solid form while the alkali metal salt formed, which is either a sulfate or chloride depending on the metal salt used, passes into a solution. The insoluble metal fluoride may then be removed from the wash liquor by any suitable means. The metal salt is then dried. Drying occurs readily at 110° C. Where the metal salt is obtained through reaction in an aqueous medium, chemically combined water is still present after this drying step and cannot be removed without using substantially higher temperatures.

Example 1

Potassium fluoride and aluminum sulfate were ground together at room temperature (approximately 30° C.). No reaction occurred during grinding nor did any reaction occur when the ground mixture was spread out on paper.

When the ground mixture was gathered together and subjected to a very light pressure on a relatively small portion of the loosely gathered mass, a reaction was initiated. A reaction was also initiated by placing the mass in a vial and gently tapping, or by dumping the mass from the mortar into a pile onto a surface, such as a sheet of paper.

The reaction was exothermic, peak temperatures of about 130° to 140° C. being reached in a mass of about 8 grams of the mixture.

The reaction was found to occur over a wide range of proportions of the reactants. Many different proportions within the range of 50 mole percent potassium fluoride to 95 mole percent of potassium fluoride were tried. The reaction proceeded as above described in each case. Also other mole ratios react readily. The peak temperatures obtained when working in the above range varied with different proportions, increasing with higher proportions of potassium fluoride. For example, when working with total masses of 8 grams, a 50 mole percent of potassium fluoride gave a peak temperature of approximately 60° C. whereas a 90 mole percent of potassium fluoride gave a peak temperature of approximately 130° C. The lowest temperature obtained was with a 50 mole percent potassium fluoride composition, and the highest temperature for 89 and 91 mole percent potassium fluoride compositions.

Increasing the total mass for a given mixture was found to increase the peak temperature obtained. For example, when an 8 gram mixture of 86 mole percent potassium fluoride and 14 mole percent aluminum sulfate were reacted, a peak temperature of 124° C. was obtained. When 16 grams of this same mixture were reacted, the peak temperature obtained was 140° C.

The product in each instance consisted of potassium sulfate and a fluoride of aluminum.

Example 2

Sixteen grams of a reaction mixture corresponding to 2 moles of C. P. KF per mole of $Na_2SO_4$ were ground together and then placed in a water bath at 48° C. A reaction was initiated and a temperature rise of 18° C. occurred. The final temperature of the reaction mixture was 52° C. and that of the water bath 47° C. X-ray patterns of the product showed none of the starting material present.

Example 3

Eight grams of a reaction mixture corresponding to 2 moles of C. P. KF per mole of $CuSO_4$, anhydrous, were ground. During the grinding the temperature of the mixture rose about 20° showing that a reaction was initiated. The ground mixture which was then at 49° C. was placed in a water bath at 53° C. However, no further reaction occurred. The same mixture was then placed in a water bath at 60° C., and the temperature of the reaction mixture rose rapidly to 87° C. X-ray patterns of the final reaction mixture indicated complete reaction, none of the starting materials being observed.

Example 4

Eight grams of a reaction mixture corresponding to 2 moles of C. P. KF per mole of $CaSO_4$ wer ground together and placed in a vial. The temperature of the mixture rose from 30° C., room temperature, to 56° C. Heating of the mixture in a water bath up to 75° C. revealed a possible second reaction at about 65° C. X-ray patterns of the product failed to show the presence of any of the starting material.

Example 5

Ten grams of a mixture corresponding to 2 moles of C. P. KF per mole of $BaCl_2$ were ground and placed in a vial. A temperature rise of about 29° C. resulted. The mixture was not heated. The X-ray pattern of the products showed the presence of $BaF_2$ and KCl.

Example 6

Eight grams of a mixture corresponding to 2 moles of C. P. KF per mole of $BaSO_4$ were ground (the mineral barite was used as the $BaSO_4$ source). The mixture was not heated. The X-ray pattern showed the presence of $BaF_2$ and none of the starting materials.

Example 7

Eight grams of a mixture corresponding to 3 moles of C. P. KF per mole of $ZnSO_4$ were ground and placed in a vial. The temperature of the mixture rose from 30° C., room temperature, to 60° C. in about 2½ minutes. After the mixture was allowed to cool to 50° C., it was placed in a water bath at 71° C. The temperature of the mixture then rose to 72° C. and remained at 72° C. for 3½ minutes while the temperature of the bath fell to 68° C. The bath was then heated to 90° C. An X-ray pattern of the resulting product showed that the reaction was substantially complete, none of the starting materials being indicated.

Example 8

Twenty grams corresponding to a mixture of 2 moles of C. P. KF per mole of $PbCl_2$ were ground and placed in a test tube. The temperature of the mixture rose from room temperature (26°C.) to 33° C. The test tube was then placed in a water bath which was at 25° C. and the bath then heated continuously. When the temperature of the bath was 40° C., the temperature of the mixture was 37° C. However, one minute later, when the bath temperature was 42° C., the reaction mixture temperature was 47° C. The reaction mixture temperature was always higher than the bath temperature for the next 29 minutes, at which time the bath temperature was 80° C. Final temperature was 95° C. The product could not be removed from the test tube nor could the thermometer in the reaction mixture be removed. After breaking the test tube, the product was removed as a coherent mass, the surface of which could, however, be powdered by rubbing. The X-ray pattern of the products showed the presence of KCl + an unknown.

Example 9

Eight grams of a mixture corresponding to 6 moles of C. P. KF per mole of $Fe_2(SO_4)_3$ were ground and placed in a vial. The temperature of the mixture then rose from room temperature, 29° C., to 65° C. in about 1½ minutes. The mixture was then heated to 98° C. The X-ray pattern of the final product indicated that the reaction was substantially complete, none of the starting materials being present.

Example 10

Sixteen grams of a mixture corresponding to 2 moles of C. P. KF per mole of $PbSO_4$ were ground and placed in a vial. The mineral anglesite was the $PbSO_4$ used. A small temperature rise occurred. The mixture was then placed in a water bath at 46° C. The temperature of the mixture then rose to 55° C. while the water bath temperature fell to 44° C. The mixture was then heated to 90° C. The X-ray pattern of the product showed the presence of $PbF_2$ and $K_2SO_4$ and none of the original materials.

Example 11

Sixteen grams of a mixture corresponding to 2 moles of C. P. KF per mole of the mineral celestite ($SrSO_4$) were ground and placed in a vial. A reaction was initiated at about 31° to 42° C. The products were identified by X-ray patterns as $SrF_2$ and $K_2SO_4$. None of the original materials was present.

The above 11 examples have been selected for the purpose of best illustrating the invention. The invention, however, is not limited to these examples alone. The variations in peak heat with variations in percent alkali fluoride reacted and in total mass occur generally in all reactions of the type herein disclosed, though in varying degree. Inclusion of such details in all of the examples would serve only to add to the length of the description.

Also, in selecting most of the examples, the preferred salt, i. e., the metal sulfate has been employed. Only two examples illustrate the use of the metal chloride. These are Examples 5 and 8. This does not mean that the chlorides are limited to barium chloride and lead chloride. Any of the other metal chlorides may be employed.

It will also be noted that in the examples potassium fluoride has been employed. This is the preferred reactant. However, caesium fluoride and rubidium fluoride can readily be used in place of potassium fluoride in any of the examples given and similar reactions obtained.

The process of the present invention is particularly suitable in many instances in preparing metal fluorides from minerals containing the metals. Thus any of the minerals barite ($BaSO_4$), anhydrite ($CaSO_4$), anglesite ($PbSO_4$), celestite ($SrSO_4$), kieserite ($MgSO_4 \cdot H_2O$) and cotunnite ($PbCl_2$) can be used.

I claim:

1. The method of reacting potassium fluoride with aluminum sulfate comprising grinding together the potassium fluoride and aluminum sulfate to form a fine powdered mix, compacting the powdered mix into a mass, containing the mass at a temperature of approximately 25° C. to 40° C. and initiating a reaction through the application of slight pressure, whereby said reaction goes substantially to completion without requiring the application of heat.

2. The method of claim 1 wherein the potassium fluoride and aluminum sulfate are present in the proportion of 40 to 60 parts by weight potassium fluoride and 60 to 40 parts by weight aluminum sulfate.

References Cited in the file of this patent

UNITED STATES PATENTS

| | | |
|---|---|---|
| 2,376,895 | Barton | May 29, 1945 |
| 2,387,203 | Willmore | Oct. 16, 1945 |
| 2,653,856 | Barr | Sept. 29, 1953 |

FOREIGN PATENTS

| | | |
|---|---|---|
| 35,212 | Germany | Apr. 5, 1886 |
| 156 | Great Britain | 1885 |
| 13,654 | Great Britain | 1886 |
| 19,738 | Great Britain | 1908 |
| 117,901 | Great Britain | July 24, 1918 |

OTHER REFERENCES

J. W. Mellor's: "A Comprehensive Treatise on Inorganic and Theoretical Chem.," vol. 5, 1924 ed., page 335 Longmans, Green & Co., N. Y.

UNITED STATES PATENT OFFICE

CERTIFICATE OF CORRECTION

Patent No. 2,800,389                                                             July 23, 1957

Isadore Mockrin

It is hereby certified that error appears in the printed specification of the above numbered patent requiring correction and that the said Letters Patent should read as corrected below.

Column 5, line 1, for "containing" read -- maintaining --.

Signed and sealed this 10th day of September 1957.

(SEAL)
Attest:

KARL H. AXLINE
Attesting Officer

ROBERT C. WATSON
Commissioner of Patents